United States Patent [19]
Brobeck et al.

[11] 3,743,801
[45] July 3, 1973

[54] TIRE DEFLATION PRESSURE SWITCH USING A DIMPLING DOME PRESSURE

[75] Inventors: William R. Brobeck; Buddy F. Lane, both of Richmond, Ind.

[73] Assignee: Avco Corporation, Richmond, Ind.

[22] Filed: Mar. 23, 1972

[21] Appl. No.: 237,386

[52] U.S. Cl.......... 200/61.25, 200/83 B, 200/83 N, 340/58
[51] Int. Cl. ............................................. H01h 35/24
[58] Field of Search ...................... 200/61.25, 83 B, 200/83 N, 83 P; 340/58; 73/146.5

[56] References Cited
UNITED STATES PATENTS
| | | | |
|---|---|---|---|
| 3,675,198 | 7/1972 | Drown | 200/61.25 |
| 3,423,552 | 1/1969 | Sipin | 200/83 B |
| 2,103,214 | 12/1937 | Coffin | 200/83 B |

FOREIGN PATENTS OR APPLICATIONS
697,286  10/1965  Italy ................................. 73/146.5

*Primary Examiner*—Robert K. Schaefer
*Assistant Examiner*—Gerald P. Tolin
*Attorney*—Charles M. Hogan and Eugene C. Goodale

[57] ABSTRACT

The tire deflation pressure switch will energize a means for indicating when the air pressure in the tire drops below a predetermined point. The pressure switch is based on a sealed enclosure comprising a thin shell dome shaped diaphragm forming one contact of the switch. The other contact provides a prestress force on the dome. When exposed to the pressure within the tire, the diaphragm will buckle if the pressure is greater than a preselected value. The buckle will appear as a small dimple in a portion of the dome. Means are provided to limit the dimpling of the dome.

5 Claims, 3 Drawing Figures

Patented July 3, 1973

3,743,801

TIRE DEFLATION PRESSURE SWITCH USING A DIMPLING DOME PRESSURE

BACKGROUND

This invention relates to switches and more particularly to a pressure switch for use in automobile tires to provide an indication that the tire has reached a dangerous degree of deflation.

Numerous prior patents have been granted on tire deflation devices. These devices have included mechanisms connected with the valve stem, mechanisms involving bellows, diaphragms, linkages, etc. These prior devices have included numerous moving parts which inherently decrease the efficiency of such devices under operation. In addition, the deflection obtained from bellows and numerous diaphragm configurations is too gradual and not sufficient at low differential pressures to provide adequate contact pressure and clearance.

Accordingly, it is an object of this invention to provide a tire deflation pressure switch with no moving parts yet is efficient in operation for providing switching effect in response to pressure.

Another object of this invention is to provide a device having repeatability of operation. A still further object of this invention is to provide a tire deflation pressure switch operate which can be designed to operate at any desired pressure.

SUMMARY

This invention provides an improved tire deflation pressure switch which can be mounted within the tire to the tire rims and wheels. The pressure switch comprises a thin shell spherical dome which is put under mechanical stress. The dome cooperates with a second member to define a sealed chamber, said chamber having a given fluid pressure. The dome buckles in response to an pressure normally considerably greater than the pressure in the sealed chamber and returns to its dome shape when the excess external pressure is reduced.

Other objects, details, uses and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention in which.

DESCRIPTION OF THE ILLUSTRATED EMBODIMENT

Figure 1:
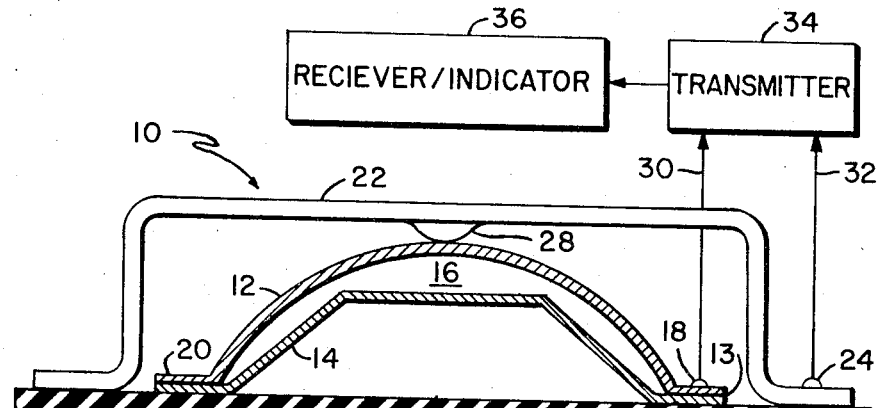
FIG. 1 is a cross-sectional view of the pressure switch showing the switch in the tire deflated position.

Reference is now made to the drawings which illustrate one exemplary embodiment of the improved tire deflation pressure switch of this invention, which is designated generally by the reference numeral 10. The pressure switch 10 is mounted to the tire rim or hub (not shown) such that when a tubeless tire (not shown) is mounted on the rim the switch 10 is in communication with the internal pressure of the tire. The switch 10 is comprised of a thin shell dome shaped diaphragm 12. The diaphragm 12 is hermetically sealed by known methods at 13 to a rigid shell member 14. The shell 14 may be located within the area of the diaphragm 12 as shown. The shell may also be a flat plate. The diaphragm 12 and shell 14 cooperate to define an enclosed or sealed fluid chamber 16.

The pressure switch 10 is formed by using the dome diaphragm 12 as one electrical contact, a terminal 18 being secured to the peripheral lip 20 of the diaphragm 12, and a bridge 22 forming the other contact. A terminal 24 is secured to the bridge 22. The diaphragm 12 and shell 14 are electrically separated from the bridge 22 by respectively mounting the parts on any suitable insulating pad 26. A contact 28 is secured to the bridge 22 so as to be in physical contact with the dome diaphragm 12 under a given condition such as under inflation or deflation of the tire, as will be explained herebelow.

It is known that for the case of a spherical shell, if the stress of the material is held within its classic limits, the buckling wave is restricted to a small dimple subtended by a solid angle of about 16°. In addition, when a segment of a spherical shell is loaded by external pressure, experiments have shown that only one single small buckle appears, whereas the rest of the shell remains in approximately spherical shape. These phenomena are respectively discussed in the *Journal of Aeronautical Sciences*, in articles appearing respectively in Vol. 7, December 1939, No. 2, pages 43–50, and August 1942, pages 373–384.

Figure 2:
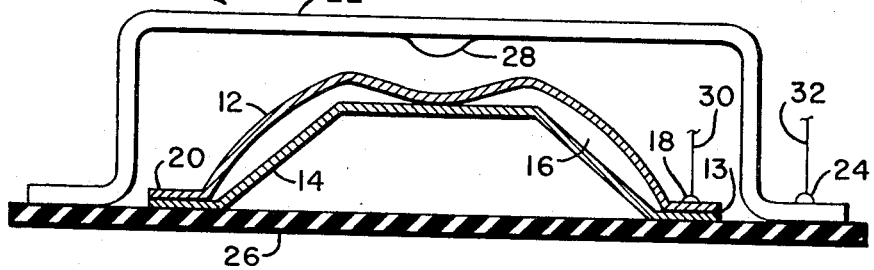
FIG. 2 is a view similar to FIG. 1 showing the switch in the pressurized position.
Figure 3:
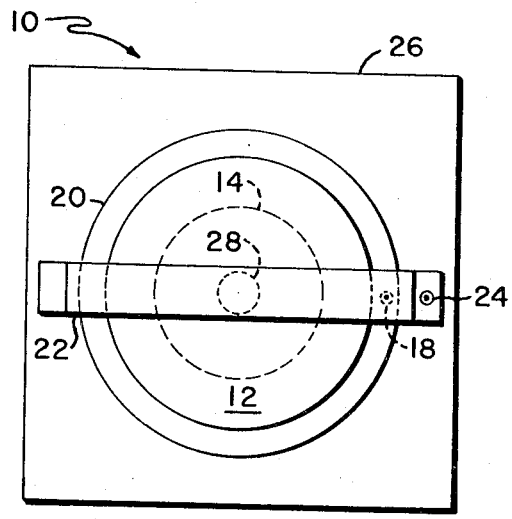
FIG. 3 is a top view of the presuure switch of FIG. 1.

Accordingly, the rigid shell 14 is so shaped within the dome diaphragm 12 including a flat shape that the horizontal portion provides a limit or stop for the buckling or of the diaphragm 12 as seen in FIG. 2. The limiting of the deformation or buckling of the diaphragm 12 is located such that the angle of the small dimple is approximately 16° and well within the elastic limit of the diaphragm 12 material. To insure that the dimple or buckling of the diaphragm 12 occurs in the correct location, the contact 28 provides a prestress force to the dome diaphragm 12. The amount of prestressing of the diaphraghm 12 can be changed by raising or lowering the bridge 22. This prestressing or preloading may also be used as a convenient and efficient means to establish the pressure at which the buckling takes place.

In operation, the pressure switch is installed to the hub or rim of the wheel within the tire and is thus exposed to the pressure within the tire. In the deflated condition the pressuresswitch remains in the position shown in FIG. 1. As the tire is inflated, the switch 10 will remain in the position shown in FIG. 1 until the pressure within the tire excees the established pressure for buckling. At this point, the dome diaphragm 12 buckles and a small dimple is created on a portion of the dome diaphragm 12 as seen in FIG. 2. The dimple will appear in the place where the dome diaphragm is preloaded with the contact 28 and the switch is thereby placed in the open condition. When the pressure in the tire is reduced to below the buckling pressure, the elasticity of the material in the dome diaphragm 12 returns the diaphragm 12 to the unbuckled position wherein the diaphragm 12 makes contact with the contact 28 thereby closing the switch. Means are provided for causing the closing of the switch to display a visible or audible signal to the operator of the vehicle to inform him that the tire is in need of reinflation. As an example, the contacts 18 and 24 may be connected by lines 30 and 32 (FIG. 1) to any suitable electrical circuit such as a transmitter 34. The transmitter, when activated by the closing of the switch 10, transmits a signal to any suitable receiver/indicator 36. It is obvious that numerous configurations of transmitter and receiver/indicators may be utilized in conjunction with the switch of this invention and the diagrammatic representation of FIG. 1 is only for explanatory purposes. When the tire is reinflated, the dome diaphragm 12 will once again buckle and open the switch 10. By holding the deformation of the dome diaphragm 12 to a small dimple or buckling, the elastic limit is not exceeded, thereby assuring repeatability of the buckling or dimpling effect.

The material thickness of the dome diaphragm 12 may also be used to control the operational pressure at which buckling will occur. As an example, if the thickness of the dome diaphragm is increased, it will require a greater tire pressure to cause the buckling.

It can be seen that the pressure switch hereinabove described has no moving parts, yet is efficient in operation for providing an on-off switching effect in response to pressure. Accordingly, the objectives hrereinbefore set forth have been accomplished.

While a present exemplary embodiment of this invention has been illustrated and described, it will be recognized that this invention may be otherwise variously embodied and practiced by those skilled in the art.

What is claimed is:

1. A pressure switch for mounting within an external pressure chamber for monitoring the pressure within the pressure chamber, the pressre switch comprising:

a thin shell dome diaphragm forming one contact of the switch;

a rigid shell, said diaphragm and shell being sealed together to define a permanently sealed fluid filled chamber therebetween;

a second contact secured in fixed relationship to said dome diaphragm and being engageable with said diaphragm to assert a prestress force thereon, said second contact engaging said diaphragm when external pressure surrounding the switch is less than a predetermined pressure;

said dome diaphragm being responsive to the external pressure surrounding the switch wherein said diaphragm buckles away from the point of prestress force to form a dimple in a portion of said dome diaphragm when the external pressure exceeds a predetermined pressure thereby providing an open switch condition, said dome diaphragm returning to the unbuckled position to provide a closed switch position when the external pressure surrounding the switch becomes less than the predetermined pressure;

means for electrically insulating said second contact from said dome diaphragm; and means connected with said diaphragm and second contact to provide an indication of the external pressure condition surrounding the switch.

2. The pressure switch as set forth in claim 1 in which said second contact comprises a bridge member mounted over said dome diaphragm a contact being secured to said bridge and being engageable with said dome diaphragm in the location where the dimpling deformation is desired.

3. The pressure switch as set forth in claim 1 in which said insulation means is an insulating pad on which said second contact means and dome diaphragm are mounted to provide the fixed relationship.

4. The pressure switch as set forth in claim 1 in which said rigid shell is formed with a horizontal portion, said horizontal portion providing a buckling limit whereby the dimpling deformation of the dome diaphragm is limited by said horizontal portion of said rigid shell.

5. The pressure switch as set forth in claim 4 in which said horizontal portion which limits the dimpling deformation is located within said dome diaphragm.

* * * * *

UNITED STATES PATENT OFFICE
CERTIFICATE OF CORRECTION

Patent No. 3,743,801      Dated July 3, 1973

Inventor(s) William R. Brobeck and Buddy F. Lane

It is certified that error appears in the above-identified patent and that said Letters Patent are hereby corrected as shown below:

In column 3, claim 1, line 37, the word -- insulatedly -- should appear before "secured"; line 38, the words "dome diaphragm" should be changed to -- rigid shell --; column 4 (claim 1), line 14, "and" should appear after the semicolon; and lines 15 and 16 in column 4 should be cancelled;

Column 4, claim 3, lines 26 - 29 should read -- 3. The pressure switch as set forth in claim 1 further comprising an insulating pad, said second contact and dome diaphragm being mounted thereon to provide the fixed relationship. --.

Signed and sealed this 2nd day of July 1974.

(SEAL)
Attest:

EDWARD M. FLETCHER, JR.
Attesting Officer

C. MARSHALL DANN
Commissioner of Patents